FIGURE 1—M.O.R. IN FIRED CLAY SPECIMEN

FIGURE 3 – T.G.A. CURVES

FIGURE 4 — T.G.A. CURVES

FIGURE 5—TGA CURVES

FIGURE 6—M.O.R. VERSUS SOAK TEMP.

FIGURE 7—M.O.R. VERSUS CONCENTRATION LiF

FIGURE 8 — REHEAT SHRINKAGE VERSUS FIRING TEMPERATURE

United States Patent Office 3,761,294
Patented Sept. 25, 1973

3,761,294
MULLITE FORMATION
Thomas Clifford Shutt, Sarnia, Ontario, Canada, assignor to Fiberglas Canada Limited, Toronto, Ontario, Canada
Filed Feb. 6, 1969, Ser. No. 797,210
Claims priority, application Canada, Feb. 9, 1968, 12,068
Int. Cl. C11b 35/16
U.S. Cl. 106—65
6 Claims

ABSTRACT OF THE DISCLOSURE

The formation of mullite in clay wares is promoted and achieved at lower firing temperatures by incorporating in the clay mix about 1 to 3% of a fluorine compound.

---

This invention relates to the formation of mullite in clay. Converting a portion of the clay to mullite produces a hard, chemical and shock resistant, high temperature stable product. To produce these articles the manufacturer must fire his ware to at least 1200° C. (or higher) for long soak periods. In accordance with the present invention mullite may be formed at lower temperatures, which will save both time and money in the production of clay bodies. This is based upon the discovery that small additions of fluoride to clay enhance the formation of mullite in the clay. The best fluorides to use are those which become reactive between 600° C. and 900° C. Such fluoride additions improve strength, thermal shock resistance, hardness and shrinkage properties. Fluorides added in small percentages can permit the firing of clay bodies to be 500° C. lower than normal (1200° C.) and still produce the physical properties equal to or better than fluoride-free mixes. It appears that 1%, 2% and 3% fluoride additions are all beneficial. Above 3% addition, the process produces an inferior product because of discoloring and bloating.

The present invention therefore provides a method of promoting mullite formation in clay comprising the step of admixing a minor proportion of a fluorine compound and heating the mixture, said fluorine compound being chosen from fluorine, hydrogen fluoride and compounds which form one or both of them on heating to a temperature of 600 to 900° C. in the mullite formation process. The fluorine compound will normally be added in an amount of 0.5 to 5 percent, or preferably 1 to 3 percent, based on the weight of the clay. Although mullite normally forms on heating clay to about 1200° C., the present invention provides a method of forming mullite at lower temperatures, for example between 700 and 1000° C. or more usually between 700 and 950° C.

Mullite ($3Al_2O_3 2SiO_2$) contains 72% $Al_2O_3$. It is a colorless, acicular mineral of the orthorhombic system which is only rarely found in nature.

Synthetic mullite can be formed by heating together stoichiometric amounts of alumina ($Al_2O_3$) and silica ($SiO_2$) but is more commonly produced by heat treatment of alumino-silicate minerals. All alumino-silicate minerals—e.g. Kyanite, Sillimenite, Clays, etc.—will convert to mullite when heated above a certain temperature. With clays the "critical" temperature is 1200° C. Conversion occurs by the continuing loss of $SiO_2$, so that the nearer an alumino-silicate mineral gets to equilibrium (at high temperatures) the larger becomes the $Al_2O_3$ content of the mineral, the $SiO_2$ migrating to the matrix. Mullite is the final high temperature phase formed during these progressive changes.

Clay is a broad term that covers many related materials. Generally all clays are considered to be formed of clay minerals and impurities.

Clay minerals

Figure 1:
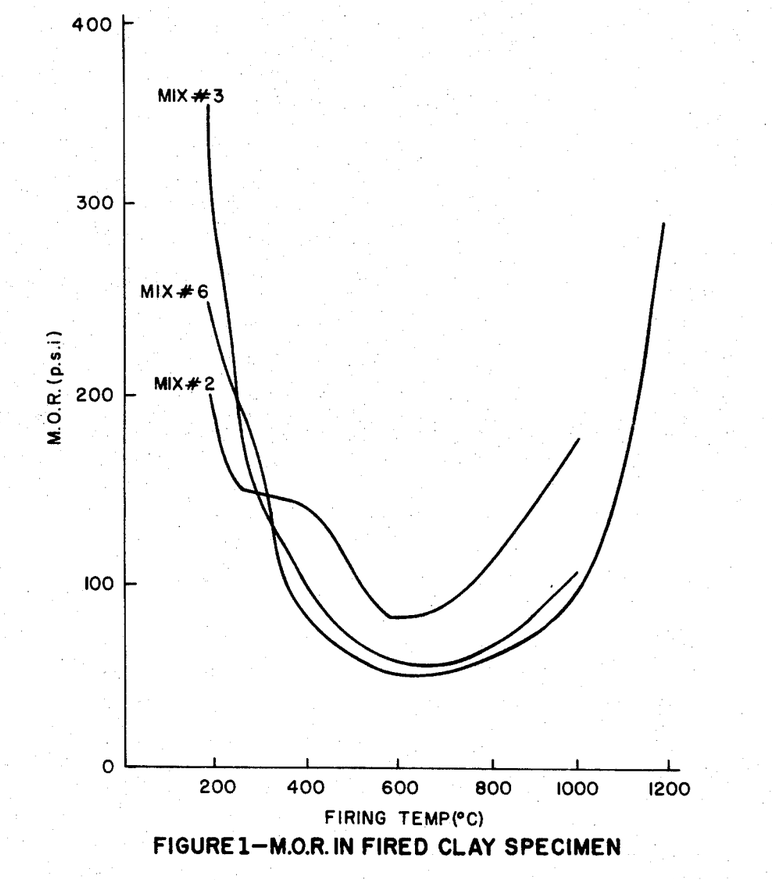
FIG. 1 shows the changes in the modulus of rupture with the addition of fluoride.

There are a few kinds of minerals that are commonly found in various proportions in clays, depending on the locality and which are called "clay minerals," as follows:

| | |
|---|---|
| Kaolinite | ⎧ The three major clay minerals. All very similar. All hydrated alumino silicates, very similar to kaolinite (as shown in Fig. 1 of the report). |
| Montmorillonite | |
| Halloysite | |
| Illite | Hydrated potassium alumino-silicate. |
| Allophane | Non-crystalline alumino-silicate. |
| Chlorite | Complex MgFe alumino-silicate. |

All clay minerals are plate-like structures. The basic structure true to all clay minerals is made of $SiO_4$ and $Al_2O_3$ units. Although the present results of experimental work relate principally to kaolin, they are applicable to the broad range of materials called clay which are usable for the formation of mullite.

Kaolinite (the major clay mineral in kaolin) has a structural formula of $Si_4Al_4O_{10}(OH)_8$ and rarely shows substitution in the lattice. The kaolinite structure is made of two basic units—a single silica tetrahedral sheet and a single aluminum octahedral sheet; the tips of the tetrahedra and one layer of the octahedra form a common layer. These 7 A. units are hydrogen bonded to successive units between the oxygen and hydroxyl layers.

Impurities

Usually $SiO_2$ and feldspar (from the original parent material), although $Fe_2O_3$ and $Al_2O5H_2O$, are often present. The most widely accepted theory about the formation of mullite from kaolin was suggested by Brindley and Nakahira ("Nature," 181, 133, 1958) who proposed several stages in the development of mullite from kaolin.

| | | Degree, C. |
|---|---|---|
| $2(Al_2O_3 \cdot 2SiO_2 2H_2O)$ | Kaolin | |
| $2Al_2O_3 \cdot 4SiO_2 + 2H_2O$ | Metakaolin | 550 |
| $2Al_2O_3 \cdot 3SiO_2 + SiO_2$ | Spinel type phase | 930 |
| $2Al_2O_3 \cdot 2SiO_2 + SiO_2$ | Mullite type phase | 1,050 |
| $2Al_2O_3 \cdot 4/3SiO_2 + 2/3SiO_2$ | Mullite | 1,200 |

With clay minerals, the general reaction that produces mullite is:

$$3(Al_2Si_2O_5(OH)_4) \xrightarrow{1200°\ C.} 3Al_2O_3 2SiO_2 + 2SiO + 4H_2O$$

The present invention has found that the addition of small amounts of fluoride to clay effectively change this reaction presumably by forming $SiF_4$ (which is gaseous above −80° C.). The unbalanced equation shown below is meant to illustrate the postulated reaction:

$$Al_2Si_2O_5(OH)_4 + 2AlF_3 \xrightarrow{x°\ C.} 3Al_2O_3 2SiO_2 + 2SiO_2 + 2HF + SiF_4$$

By producing $SiF_4$ the clay lattice is believed to be strained and stretched so that ion diffusion is easier and hence mullite forms more quickly.

EXAMPLE 1

Experiments were carried out by the present invention using barium fluoride, lithium fluoride and sodium silicofluoride as mineraliser. Owen clay (a kaolinite) was the only mineral in the mix apart from the mineralisers. The mix compositions were:

Parts w./w.
Owen clay (−300 U.S. sieve) _____________________ 60
Water ____________________________________ 40
Fluoride ___________________________________ 1

The mixes were dry blended, water added, mixed and cast and dried at 90° C. Two specimens of each fluoride mix were prepared and fired at 800° C. and 1000° C. Study of thin sections of the resulting material showed that in every case except the 800° C. fired barium fluoride mix, mullite had formed without causing harmful effects such as cracking or spalling.

EXAMPLE 2

Because sodium silicofluoride was the cheapest (about 60¢ lb.) this mineraliser was used in a more exhaustive investigation described below. Seven mixes were made (see Table 1); the only component was clay which, although it would give low strength values, would make the study of mullite easier because of its abundance. Water and mono aluminum phosphate were used as bonding agents.

TABLE 1

| Composition | Mix number | | | | | | |
|---|---|---|---|---|---|---|---|
| | 1 | 2 | 3 | 4 | 5 | 6 | 7 |
| Owen clay (green) | 700 | 700 | 700 | 700 | 700 | 700 | 700 |
| Sodium silicofluoride | 7 | 7 | 3½ | 7 | | | 3½ |
| 50% solution M.A.P. | 500 | | | 250 | 500 | | 500 |
| Water | | 400 | 400 | 250 | | 400 | |

Note.—NB:
1. All readings in grams.
2. Treatment—Air dried; dried at 60° C. for 4 hours; 2 hr. soak on temperature.

(1) MODULUS of rupture

In both the phosphate and water bonded samples, the highest strengths are found in the 1% fluoride additions, followed by the ½% fluoride additions and the weakest is without fluoride, see FIG. 1.

For the purpose of simplicity only the water bonded specimens will be discussed, since these specimens illustrate best, the effect fluoride addition. With any given starting composition, the initial variation in green strength is due to fabrication technique. At the 500° C. firing the strength of No. 2 is 75% greater than No. 6 and at 1000° C. it is 110% greater. The drop in No. 2 at 540° C. could be prevented by a slightly longer firing time.

(2) Thin sections

Thin sections were made of every specimen. Photomicrographs of the 800° C. test specimens were made, from which it could be seen that the 1% fluoride mixes produced approximately 5% of mullite. The ½% fluoride seemed to produce about 1% mullite and the mixes without fluoride have produced no mullite.

(3) X-ray results

5% is the lower limit of detection by X-ray determination. Discounting the specimens that are fired at 1200° C. (which must form mullite) the only other specimens that contained measurable amounts of mullite, all had fluoride addition.

In the drawings which accompany this application.

EXAMPLE 3.—FLUORIDE-CLAY REACTIONS

Figure 2:
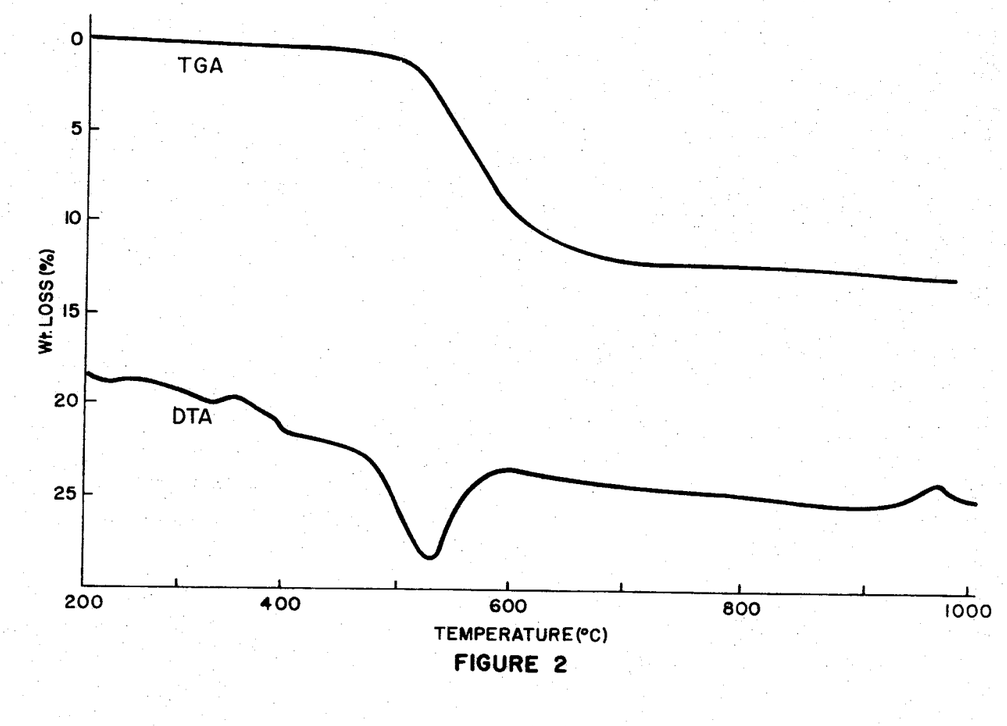
FIG. 2 shows some characteristics of typical kaolin.

Raw materials (a) Kaolin.—A "typically available" Georgia kaolin was used; it contains approximately 93% kaolin and 7% illite and shows good crystallinity (FIG. 2). The DTA (Differential Thermal Analysis) curve for kaolin is 'typical" in that it shows a large endotherm at 550° C. and a small exotherm at 950° C. The endotherm is due to dehydroxylation and the exotherm is due to nucleation of the precursor of mullite. A pure kaolinite was not used since the effect of normal impurities would not be seen; the properties are shown below:

Properties of kaolin

| | Percent |
|---|---|
| $SiO_2$ | 45.92 |
| $Al_2O_3$ | 37.02 |
| $Fe_2O_3$ | 1.16 |
| $TiO_2$ | 1.05 |
| CaO | 0.32 |
| MgO | 0.26 |
| $Na_2O$ | 0.29 |
| $K_2O$ | 0.22 |
| Loss on ignition | 12.75 |
| Water of plasticity | 37.5 |
| Theoretical mullite | 59.7 |
| Particul size (less than $10\mu$) | 90 |
| Particle size (less than $1\mu$) | 60 |

(b) Fluorides.—Three types of fluorides were used in the experiments. The fluorides became reactive (i.e., melt, sublime or dissociate) within three different temperature ranges.

Type 1: Fluorides that became reactive between ambient and 450° C.

Type 2: Fluorides that became reactive between 550° C. and 850° C.

Type 3: Fluorides that became reactive beyond 1100° C.

The fluorides and their properties (deduced by DTA and TGA) are shown in Table 2. These fluorides, by becoming reactive in the three "stable" areas of kaolin, should produce effects that are detectable on the DTA; specifically the endotherm, the exotherm and the temperature and amount of mullite formation should differ from the standard kaolin.

Procedure

Dry blends were made using kaolin and fluoride. With the exception of $Na_2SiF_6$, all fluorides were mixed as 1% and 5% additions. With $Na_2SiF_6$ seven mixes were made; they were ½%, 1%, 2%, 3%, 4%, 5% and 10% additions. After dry blending they were mixed with 38% water, blended again, then dried at 110° C. Samples were taken from the dried clay mixes for DTA and TGA studies. A third specimen was taken from the mixes and fired to 950° C. and allowed to soak for one hour. This specimen provided samples for X-ray and optical microscopical studies. With the 10% $Na_2SiF_6$ mix, three other samples were also fired to 650° C., 750° C. and 850° C. and used for X-ray studies.

Experimental results (a) DTA.—With the type 1 fluorides, $SbF_3$, which sublimes, seems not to have had any effect on the kaolin structure whereas 5% $NH_4F.HF$ shows a 20° C. downscale shift of the endotherm when compared with the 1% $NH_4F.HF$. With type 2 fluorides there is no modification of the endotherm (as expected), but the exotherm shows that modifications to the kaolin structure must have occurred. With LiF the exotherm is nonexistent at 5% concentration; with $Na_2SiF_6$ the same thing will probably occur at about 7% concentration. The stable Type 3 fluorides show no effect on DTA curve for kaolin.

Figure 3:
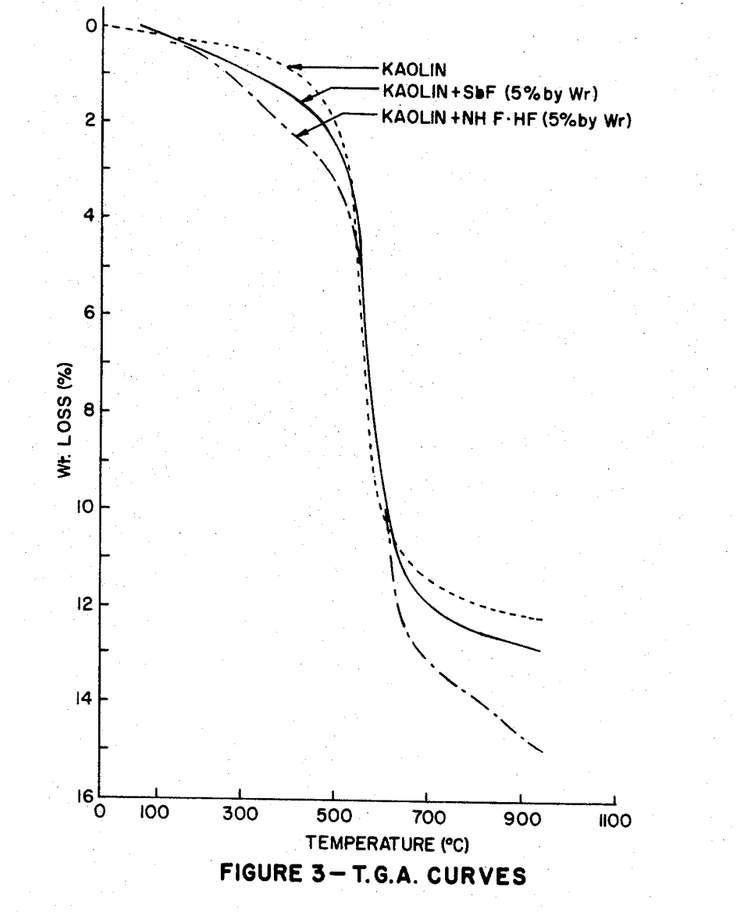
FIGS. 3, 4 and 5 show changes in the thermo-gravimetric analysis (T.G.A.) characteristics of kaolin with addition of fluorides.
Figure 4:
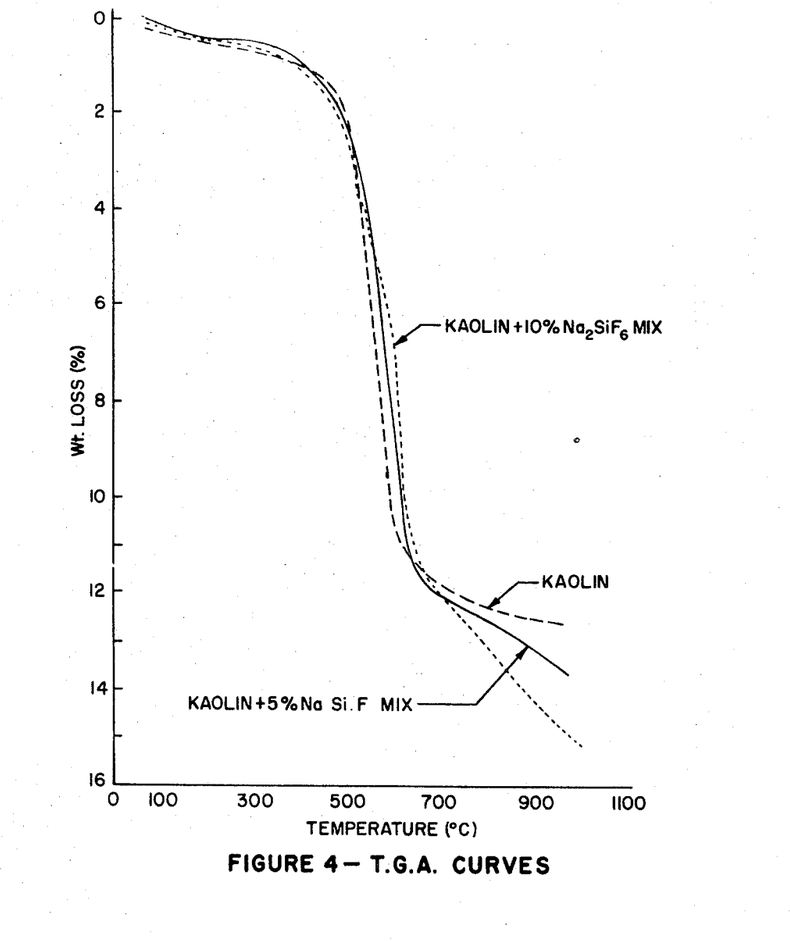
Figure 5:
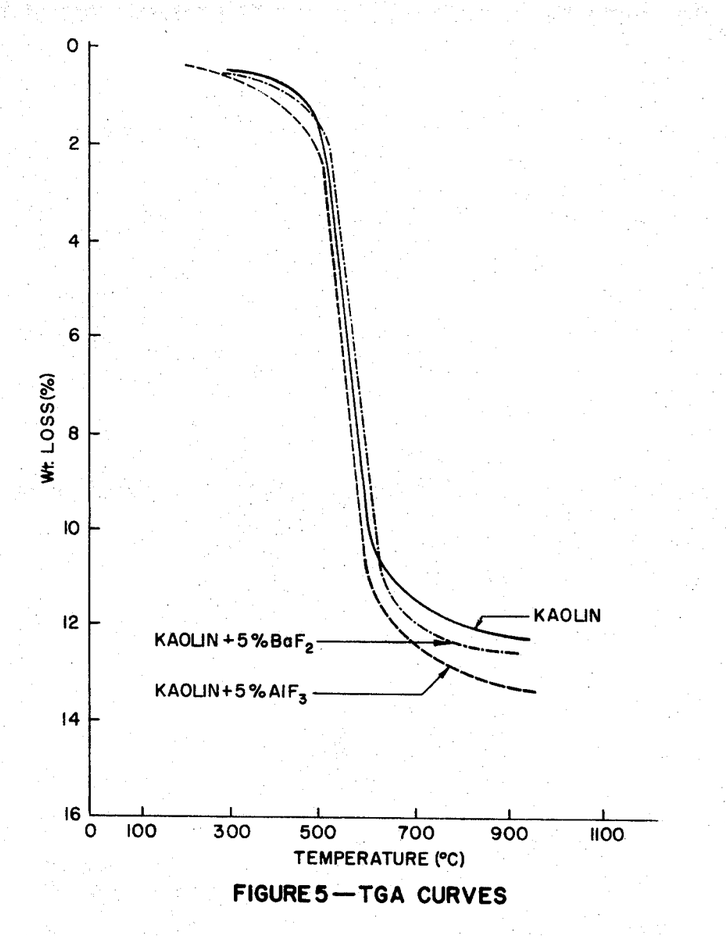

(b) TGA.—The TGA curves are shown in FIGS. 3, 4 and 5. The addition of fluorides causes slight changes in the TGA curves for kaolin. When these samples are held on temperature until constant weight is reached at 950° C. they show the following weight losses.

| | | | | |
|---|---|---|---|---|
| 5% $SbF_3$ | Plus kaolin | Weight loss | =17.1% | Note.—95% kaolin without absorbed water loses approx. 11.8% |
| 5% $NH_4F.HF$ | do | do | =18.5% | |
| 5% $Na_2SiF_6$ | do | do | =14.3% | |
| 5% LiF | do | do | =12.0% | |
| 5% $BaF_2$ | do | do | =12.2% | |
| 5% $AlF_3$ | do | do | =13.8% | |

(c) X-ray.—The results of X-ray studies are tabulated in Table 3. It can be seen that the Type 2 fluorides give the most mullite formation; mullite can be detected as starting to form as low as 750° C. with 10% fluoride concentration. The Type 3 fluorides produce small amounts of mullite and the Type 1 fluorides fall between the other two.

(d) Optical microscope.—Thin sections were made of the 5% fluoride mixes fired at 950° C. for 1 hour. Apart from the amount of mullite formed all the sections were similar. The formation of volatile phases had not caused cracking or spalling or local vitrification. Mullite and free silica are well developed, but the mullite shows slight signs of strain (also detectable in X-ray by slight shift in "$d$" spacing). Nearly all the mullite crystals are the same order of size as the original clay particles; about 1% of the crystals are considerably longer. This intermittent crystal growth is probably due to crystal re-orientation in adjacent clay particles rather than to bulk diffusion; the high aspect ratio of most of the large crystals supports this idea. With LiF and $Na_2SiF_6$ doped mixes there is an exceptional number of large crystals and most of them do not show such high aspect ratios.

The formation of HF and $SiF_4$ causes a Si deficiency which strains the lattice and permits the easier diffusion of the Al ion—thus forming 25% mullite at 950° C.

$NH_4F \cdot HF$—Kaolin mix.—The loss to constant weight shows a loss considerably greater than the 5% for $NH_4F \cdot HF$ and is exactly equivalent to the loss expected by the following reaction:

By the same reaction steps as described in $SbF_3$, $SiF_4$ is finally produced and 30% mullite is formed. The formation of HF in the hydroxyl layer ultimately reduces the degree of crystallinity as seen by the 20° C. downscale shift of the DTA endotherm.

$Na_2SiF_6$-Kaolin mix.—The weight loss is equivalent to the normal loss from dehydroxylation plus the volatization from the pure fluoride (as shown on TGA curve for the pure fluoride). This infers the reaction at 950° C. of:

$$Na_2SiF_6 + Kaolin \Rightarrow 2NaF_{(liquid)} + Kaolin + SiF_{4(gas)}$$

It seems unlikely that any gas reaction would occur between $Na_2SiF_6$ and kaolin. NaF melts at 980° C. but the

TABLE 2.—SUMMARY OF FLUORIDE PROPERTIES

| Type | Name | Composit | M.P., °C. | S.T., °C. | D.T., °C. | Percent decomposition | Decomposition products |
|---|---|---|---|---|---|---|---|
| 1 Becomes reactive before endotherm reaction. | Ammonium fluoride | $NH_4F \cdot HF$ | | | 240–280 | 100 | $NH_3 + 2HF$. |
| | Antimony fluoride | $SbF_3$ | 287 | 309 | | | $SbF_3$ gas. |
| 2 Becomes reactive between endotherm and exotherm. | Sodium silicofluoride | $Na_2SiF_6$ | | | 559 | 54 | 2 NaF plus $SiF_4$. |
| | Lithium fluoride | LiF | 846 | | | | LiF liquid. |
| 3 Becomes reactive after exotherm | Aluminum fluoride | $AlF_3 \cdot 3\tfrac{1}{2}H_2O$ | 1,291 | 1,291 | | | 17% $AlF_3$ gas at 950° C. |
| | Barium fluoride | $BaF_2$ | 1,280 | | | | Nil. |

Note.—M.P.=Melting point, S.T.=Sublimation temperature, D.T.=Decomposition temperature.

TABLE 3.—SUMMARY OF X-RAY DATA

| Fluoride type | Fluoride | Fluoride concentration, percent | Test temperature, °C. | Mullite percent | Other mineral phases | Average maximum crystal size (μ) |
|---|---|---|---|---|---|---|
| | Nil | Nil | 950 | Nil | Kaolin=Illite | |
| | | | 1,300 | 58 | β α (minor) | |
| 1 | $SbF_3$ | 1 | 950 | | | |
| | $SbF_3$ | 5 | 950 | 25 | Amorphous plus 5% U.C. | 27 |
| | $NH_4F \cdot HF$ | 1 | 950 | | | |
| | $NH_4F \cdot HF$ | 5 | 950 | 30 | Amorphous plus 5% U.S. | 21 |
| 2 | LiF | 1 | 950 | 13 | Petalite: β α | |
| | LiF | 5 | 950 | 56 | Petalite: β | |
| | LiF | ½ | 950 | (¹) | (¹) | |
| | LiF | 1 | 950 | (¹) | (¹) | |
| | LiF | 2 | 950 | (¹) | (¹) | |
| | $Na_2SiF_6$ | 3 | 950 | (¹) | (¹) | |
| | $Na_2SiF_6$ | 4 | 950 | (¹) | (¹) | |
| | $Na_2SiF_6$ | 5 | 950 | 47 | β Major, α minor | 26 |
| | $Na_2SiF_6$ | 10 | 650 | (¹) | (¹) | |
| | $Na_2SiF_6$ | 10 | 750 | 0 | Amorphous | |
| | $Na_2SiF_6$ | 10 | 850 | 49 | β Major | |
| | $Na_2SiF_6$ | 10 | 950 | 57 | α Minor | 28 |
| 3 | $AlF_3 \cdot 3\tfrac{1}{2}H_2O$ | 1 | 950 | | | |
| | $AlF_3 \cdot 3\tfrac{1}{2}H_2O$ | 5 | 950 | 13 | 1% Q=5% U.C. rest amorphous | 24 |
| | $BaF_2$ | 1 | 950 | | | |
| | $BaF_2$ | 5 | 950 | 5 | Barium aluminum silicate (minor) I=3% U.C. amorph | 30 |

¹ Totally amorphous.

Note.—β=βCristobalite; α=αCristobalite; U.C.=Unidentified Crystalline Material; Q=Quartz; I=Illite.

A discussion of the probable mechanism of mullite formation with each fluoride is set forth.

$SbF_3$-Kaolin mix.—$SbF_3$ sublimes at 309° C., but TGA shows that even at 950° C. all the $SbF_3$ has not left the system. The loss to constant weight at 950° C. shows a loss slightly greater than theoretical which suggests that some $SiF_4$ has formed, i.e.:

$$SbF_3 \Rightarrow SbF_{3(gas)} + (Sb_2O_3 + SiF_4)_{(minor)}$$

this probably occurs through the formation of HF below 550° C. which reacts with the clay as follows:

$$4HF + SiO_2 \rightarrow 2H_2O + SiF_4$$

presence of impurities therefore must cause a lowering of the melting point. At high temperatures therefore the NaF is a liquid which must cause dissolution of the kaolin and permit a rapid diffusion through the liquid and hence the formation of nearly theoretical maximum mullite. The melting point of NaF must (with this clay) be reduced to between 760° C. and 840° C. because as shown with the 10% $Na_2SiF_6$ additions at 750° C. firing temperatures there is no mullite and at 850° C. firing temperature 49% mullite has been formed.

LiF-Kaolin mix.—In exactly the same manner as described in $Na_2SiF_6$, mullite grows by the "sink" diffusion through LiF liquid. The melting point of LiF is 846° C.

which again is probably lowered by impurities. It seems probable that kaolin has the same dissolution rate in NaF as it does in LiF at the same temperature. The production of more mullite in LiF mix infers therefore a lower melting point with the fluoride and hence a longer dissolution and diffusion time.

As with the 10% $Na_2SiF_6$, the 5% LiF mix shows no exotherm on DTA, so the reaction to form mullite must have been completed before 950° C. was reached. On cooling the specimen, the final liquid must have had the composition $LiO \cdot Al_2O_3 \cdot 8SiO_2$ because a small amount of petalite can be identified. There are no other minerals of the $\beta$ spodumene series present and therefore mullite must have been precipitated at the same rate as kaolin was being dissolved. The liquid therefore probably did not increase beyond the nominal 5% so one would not expect much weakening of the structure during firing.

With this mix and the $Na_2SiF_6$ mix there must have been gradual reaction between liquid and dissolved silica to produce $SiF_4$ because of the almost total lack of fluorine in the final products.

$AlF_3 \cdot 3\frac{1}{2}H_2O$-Kaolin mix.—The sublimation temperature of $AlF_3$ is 1291° C. but it still loses 17% of its weight by sublimation between 650° C.–950° C. Although there is probably some solid-solid reaction it seems probable the $AlF_3$ gas reacts with kaolin to give $Al_2O_3$ and $SiF_4$. In so doing the rigid lattice is weakened, diffusion rate is increased, and 13% mullite forms. However, $Al_2O_3$ could not be detected in the clay. It is not known whether there was too little for detection or, being highly reactive it also combined with $SiO_2$ to form mullite.

$BaF_2$-Kaolin mix.—$BaF_2$ forms neither a liquid nor a gas at 950° C. It has partially reacted (in the solid state) with kaolin to produce Hyalophane ($BaAlSi_3O_8$) and therefore a release of fluorine has occurred. The formation of $SiF_4$ has permitted the formation of 5% mullite in the manner described for $AlF_3$.

HF-Kaolin mix.—Many of the conclusions are based upon the assumption that HF takes part in the reaction. As a confirmatory experiment, four other samples were made. Two samples contained 1% HF by weight and two other samples contained 5% HF. After firing a 1% and a 5% mix at 1200° C. the theoretical amount of mullite had formed (as expected). The 1% and 5% mixes fired at 950° C. showed the formation of 4% and 18% mullite. HF obviously therefore acts as a catalyst in mullite formation but being a liquid at room temperature it is very volatile, thus reducing its effectiveness.

STUDY OF PHYSICAL PROPERTIES

It is theoretically possible that some concentrations of fluoride could have a deleterious effect upon the final specimen because of blow hole formation, bloating, spalling, cracking, etc. To determine these possibilities a series of physical tests were undertaken, including Modulus of Rupture, Indentation Hardness, Thermal Shock Resistance, and Reheat Shrinkage.

Because of the problems in making and firing a body composed entirely of non-calcined clay a number of tests were conducted to determine the ideal mix. The final mix composition (Mix 4A) that was used in testing was:

Kaolin (Owen clay) ______________________________ 40
Ball clay (Century clay) _________________________ 20
Alumina 46F ____________________________________ 20
Alumina 250F ___________________________________ 20
Water (0.1% sol. of Calgor) _____________________ 6

The mixes that were made were composed of the above composition with additions of 0%, 1%, 2%, 3% and 5% LiF. The 0% (pure mix) was used as our comparative standard in the testing. LiF was chosen because of its effectiveness in catalysing mullite, as described in phase B.

The mixes were first dry blended in a sigma for 15 minutes, then 6% (by weight) of water was added and they were then wet blended for 20 minutes. After mixing, approximately 1 lb. (400 gms.) of the mix was poured into a 6" x 2" x 2" mould and pressed at 1250 p.s.i.

After pressing, the specimens were dried and fired. Firing temperatures from 600° C. to 1200° C. were used and some specimens were given a one hour soak and others given a two hour soak. The actual firing schedule can be seen in Table 4.

TABLE 4.—FIRING SCHEDULE FOR PHYSICAL TEST SPECIMENS

| Temp.,° C. | Conc. of LiF | | | | | | | | |
|---|---|---|---|---|---|---|---|---|---|
| | 1 hour soak, percent | | | | 2 hour soak, percent | | | | |
| | 0 | 1 | 2 | 3 | 5 | 0 | 1 | 2 | 3 | 5 |
| 600 | √ | √ | | | √ | √ | √ | | √ | √ |
| 700 | √ | √ | | | √ | | | | | |
| 800 | √ | √ | | | √ | | | | | |
| 900 | √ | √ | √ | √ | √ | √ | √ | √ | √ | √ |
| 1,000 | √ | √ | | | √ | | | | | |
| 1,100 | √ | √ | | | √ | | | | | |
| 1,200 | √ | √ | √ | √ | √ | √ | √ | √ | √ | √ |

NOTE.—√=Denotes temperatures at which specimens were fired.

The prepared specimens were then subjected to the various tests described above.

Figure 6:
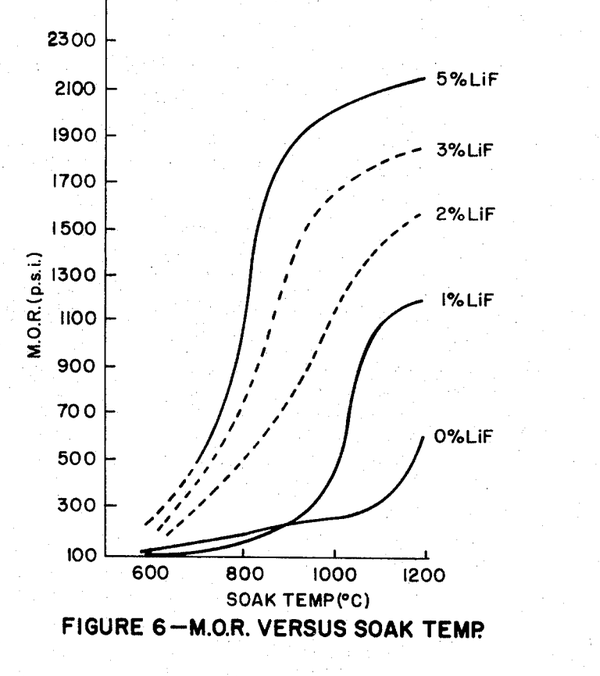
FIG. 6 shows changes in the M.O.R. with different soak temperatures.
Figure 7:
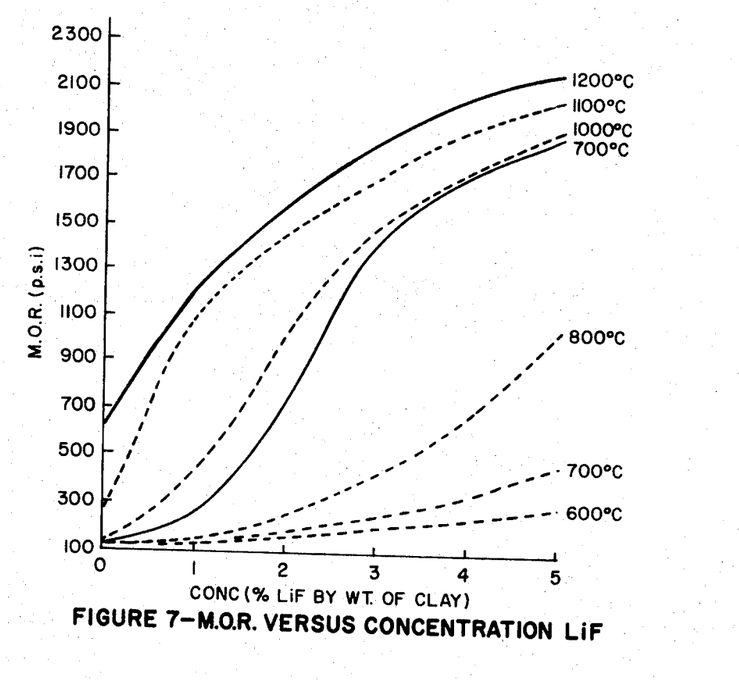
FIG. 7 shows changes in the M.O.R. with different amounts of L.I.F. and different firing temperatures.

Results (1) Modulus of rupture (M.O.R.).—M.O.R. tests were conducted following the procedure of ASTM C–133–55 using a 6" x 2" x 1" specimen (approximate size). All the results are tabulated in Table 5 and in FIGS. 6 and 7, these results are plotted in graph form. In the graph of FIG. 7, the temperatures on the right indicate the firing temperatures used.

TABLE 5.—MODULUS OF RUPTURE (A.S.T.M. C–133–55) in p.s.i.

| Temp., ° C. | Concentration of LiF | | | | | | | | | |
|---|---|---|---|---|---|---|---|---|---|---|
| | 1 hour soak, percent | | | | | 2 hour soak, percent | | | | |
| | 0 | 1 | 2 | 3 | 5 | 0 | 1 | 2 | 3 | 5 |
| 600° | 134 | 99 | | | | | | | | |
| 700 | 166 | 106 | | | 494 | | | | | |
| 800 | 172 | 141 | | | 1,054 | | | | | |
| 900 | 267 | 246 | 737 | 2,123 | 1,914 | 220 | 727 | 1,195 | 1,667 | 1,568 |
| 1,000 | | 432 | | | 1,905 | | | | | |
| 1,100 | 284 | 1,104 | | | 1,978 | | | | | |
| 1,200 | 627 | 1,120 | 1,589 | 1,880 | 2,188 | 883 | 1,001 | | 1,562 | 1,945 |

NOTE.—Values are averages of 3 tested specimens.

The table and graphs illustrate well the benefits of adding small fluoride percentages to the mix. It appears that for any given mix there will be an ultimate strength that can be achieved, and further firing will not affect this value. In the case of these mixes the final strength is in the order of 2,000 p.s.i. (M.O.R.), that is, three times the strength of the 1200° C. standard specimen. On this presumption, a 3% fluoride addition fired at 900° C. (300 C. degrees below normal) will give optimum results.

Additions of 1% fluoride up to 3% fluoride give a linear increase in strength. Similarly, when fluoride mixes are fired there is a rapid increase in M.O.R. values as the specimens are fired up to about 900° C. The reverse is true, however, for the fluoride free mix. It can be concluded therefore that fluoride additions stimulate a reaction to form mullite at 900° C. and below, that normally happens in fluoride-free mixes at 1200° C.

(2) Indentation hardness (I.H.).—The M.O.R. tests give an indication of internal strength whilst the I.H. tests indicate surface hardness (strength). Surface hardness is of importance because all articles must be handled without being scratched or chipped. The results (Table 6) show that fluoride additions cause an increase in surface hardening. It should be explained that the relationship between penetration and hardness is nearer logarithmic than linear and hence these results indicate that the 2% and 3% fluoride additions cause considerable increase in surface hardness. This test was a modification of ASTM E-103–61.

TABLE 6.—INDENTATION HARDNESS

| Temp., °C. | Concentration of LiF | | | | | | | | | |
|---|---|---|---|---|---|---|---|---|---|---|
| | 1 hour soak, percent | | | | | 2 hour soak, percent | | | | |
| | 0 | 1 | 2 | 3 | 5 | 0 | 1 | 2 | 3 | 5 |
| 600 | (¹) | (¹) | | | | | | | | |
| 700 | (¹) | (¹) | | | | | | | | |
| 800 | (¹) | (¹) | | | | | | | | |
| 900 | (¹) | (¹) | (¹) | 0.025 | 0.028 | (¹) | (¹) | 0.040 | | 0.025 |
| 1,000 | (¹) | 0.029 | | | | | | | | |
| 1,100 | (¹) | 0.031 | | | | | | | | |
| 1,200 | 0.031 | 0.027 | 0.022 | 0.021 | 0.020 | 0.022 | 0 027 | | | 0.023 |

¹ Denotes that the specimens shattered on testing.

NOTE.—Figures quoted are inches of penetration with a 450 lb. load.

(3) Thermal shock resistance (T.S.R.)—Specimens measuring 4″ x 1″ x 1″ were heated in a muffle at 1000° C. for 10 minutes, by which time they had reached 1000° C. After 10 minutes they were removed, plunged into water at 20° C. and kept there for 10 minutes. This cycle was repeated either until the specimen broke or it reached 6 cycles.

The same trend, as already seen, is repeated in the T.S.R. results (Table 7). Fluoride additions considerably increase shock resistance and above 1% addition the results are excellent.

TABLE 7.—THERMAL SHOCK RESULTS

| Temp., °C. | Conc. of LiF | | | | | | | | | |
|---|---|---|---|---|---|---|---|---|---|---|
| | 0 | 1 | 2 | 3 | 5 | 0 | 1 | 2 | 3 | 5 |
| 600 | 0 | 0 | | | | | | | | |
| 700 | 0 | 0 | | | | | | | | |
| 800 | 0 | 0 | | | | | | | | |
| 900 | 0 | ½ | 3 | >6 | >6 | 0 | 1½ | 3 | | |
| 1,000 | 0 | 2 | | | | | | | | |
| 1,100 | 0 | 3 | | | | | | | | |
| 1,200 | 1 | 3 | >6 | >6 | >6 | 1½ | 3 | 6 | | |

NOTE.—Units denote cycles completed (i.e., 10 min. at 1,000° C. and 10 min. in water.

Figure 8:
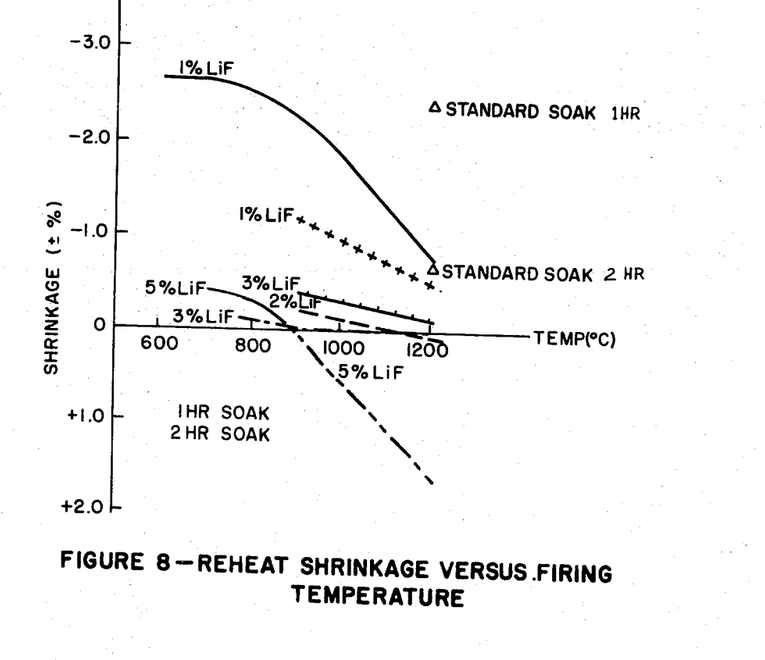
FIG. 8 shows changes in the re-heat shrinkage.

(4) Reheat shrinkage.—The reheat shrinkage test (R.S.) followed ASTM C–113–61. Table 8 and FIG. 8 provide the results of the test. Two significant parts should be explained. Fluoride additions of 2% and 3% appear to be optimum since they completely stabilize the mix. That is, the mix reaches high temperature stability and does not show adverse effects. With 5% addition of fluoride however, it appears that bloating occurs to some extent. This is not surprising because there would, under firing conditions, be considerable liquid present.

TABLE 8.—REHEAT SHRINKAGES (A.S.T.M. 113-61) (IN PERCENT)

| Temp., °C. | Concentration of LiF | | | | | | | | | |
|---|---|---|---|---|---|---|---|---|---|---|
| | 1 hour soak, percent | | | | | 2 hour soak, percent | | | | |
| | 0 | 1 | 2 | 3 | 5 | 0 | 1 | 2 | 3 | 5 |
| 600 | −2.7 | | | | | | | | | |
| 700 | | | | | −0.4 | | | | | |
| 800 | −2.6 | | | | −0.3 | | | | | |
| 900 | −2.3 | | | | Nil | | −1.2 | −0.2 | Nil | |
| 1,000 | | | | | Nil | | | | | |
| 1,100 | | | | | Nil | | | | | |
| 1,200 | −2.44 | −0.7 | −0.1 | −0.6 | −0.7 | −0.5 | +0.1 | Nil | +1.63 | |

The results of firing shrinkage measurements are given in Table 9.

TABLE 9.—FIRING SHRINKAGE (IN PERCENT)

| Temp., °C. | Concentration of LiF | | | | | | | | | |
|---|---|---|---|---|---|---|---|---|---|---|
| | 1 hour soak, percent | | | | | 2 hour soak, percent | | | | |
| | 0 | 1 | 2 | 3 | 5 | 0 | 1 | 2 | 3 | 5 |
| 600 | 0.44 | 0.44 | | | | 3.46 | 3.45 | | 2.31 | 3.15 |
| 700 | 0.49 | 0.54 | | | 0.66 | | | | | |
| 800 | 0.44 | 0.66 | | | 0.49 | | | | | |
| 900 | 0.54 | 1.41 | 1.75 | 1.02 | 0.54 | 0.54 | 0.88 | | 1.36 | |
| 1,000 | 0.91 | 1.81 | | | 0.54 | | | | | |
| 1,100 | 1.33 | 2.32 | | | 0.60 | | | | | |
| 1,200 | 3.48 | 2.81 | 2.74 | 1.14 | 0.82 | | | | | |

I claim:

1. A method of promoting mullite formation in clay comprising the step of admixing therewith a minor proportion of a fluorine compound and heating the mixture, said fluorine compound being chosen from fluorine, hydrogen fluoride and compounds which form one or both of them on heating to a temperature of 600 to 900° C. in the mullite formation process, said fluorine compound being added in an amount of 0.5 to 5% and firing the mixture at a temperature in the range 700–1000° C.

2. A method as in claim 1 in which the fluorine compound is present in an amount of 1 to 3%.

3. A method as in claim 1 wherein the clay is preponderantly kaolin.

4. A method as in claim 1 wherein the fluorine compound is chosen from the group consisting of SbF₃, NH₄F·HF, Na₂SiF₆, LiF, AlF₃, AlF₃·3½H₂O, and BaF₂.

5. A method as in claim 1 wherein the firing is conducted at a temperature of from 700 to 950° C.

6. A method as in claim 1 wherein the firing is conducted at a temperature of from 750 to 900° C.

References Cited

UNITED STATES PATENTS 1,644,244  10/1927  Freed _______________ 106—67
3,251,699  5/1966  Smith et al. _________ 106—67

JAMES E. POER, Primary Examiner

U.S. Cl. X.R.

106—67, 71, 73

UNITED STATES PATENT OFFICE
CERTIFICATE OF CORRECTION

Patent No. 3,761,294　　　　Dated September 25, 1973

Inventor(s) Thomas C. Shutt

It is certified that error appears in the above-identified patent and that said Letters Patent are hereby corrected as shown below:

Column 1, line 60, change the spelling of "Sillimenite" to -- Sillimanite --.

Column 2, line 48, the right hand side of the equation should be changed from "$3Al_2O_3 2SiO_2 + 2SiO + 4H_2O$" to read -- $3Al_2O_3 \cdot 2SiO_2 + 4SiO_2 + 6H_2O$ --.

Column 3, line 36, insert the word -- of -- between the words "effect" and "fluoride".

Column 4, line 18, change "Particul" to -- Particle --.

Signed and sealed this 26th day of November 1974.

(SEAL)
Attest:

McCOY M. GIBSON JR.　　　　C. MARSHALL DANN
Attesting Officer　　　　　　Commissioner of Patents